United States Patent
Gan et al.

(10) Patent No.: US 8,452,007 B2
(45) Date of Patent: May 28, 2013

(54) SECURITY KEY GENERATING METHOD, DEVICE AND SYSTEM

(75) Inventors: Lu Gan, Shenzhen (CN); Zhongda Du, Shenzhen (CN); Xiang Cheng, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 265 days.

(21) Appl. No.: 12/988,051

(22) PCT Filed: Dec. 30, 2008

(86) PCT No.: PCT/CN2008/073868
§ 371 (c)(1), (2), (4) Date: Oct. 15, 2010

(87) PCT Pub. No.: WO2009/127114
PCT Pub. Date: Oct. 22, 2009

(65) Prior Publication Data
US 2011/0033053 A1    Feb. 10, 2011

(30) Foreign Application Priority Data

Apr. 16, 2008  (CN) .......................... 2008 1 0066591

(51) Int. Cl.
*H04L 29/06* (2006.01)
*H04L 29/00* (2006.01)
*H04L 9/32* (2006.01)

(52) U.S. Cl.
USPC .............................. 380/44; 380/45; 713/171

(58) Field of Classification Search
None
See application file for complete search history.

(56) References Cited

U.S. PATENT DOCUMENTS

| | | | |
|---|---|---|---|
| 2007/0249352 A1* | 10/2007 | Song et al. | 455/436 |
| 2008/0095362 A1* | 4/2008 | Blom et al. | 380/45 |
| 2011/0004762 A1* | 1/2011 | Horn | 713/171 |

FOREIGN PATENT DOCUMENTS

| | | |
|---|---|---|
| CN | 1905734 A | 1/2007 |
| CN | 101102600 A | 1/2008 |
| CN | 101257723 A | 9/2008 |
| CN | 101267668 A | 9/2008 |
| WO | 2007125486 A2 | 11/2007 |

* cited by examiner

*Primary Examiner* — Shin-Hon Chen
(74) *Attorney, Agent, or Firm* — Li & Cai Intellectual Property (USA) Office

(57) ABSTRACT

A security key generating method, device and system are provided, wherein, the method is used for generating a security key in the process of the handover to an EUTRAN network from other network, the method includes: an MME generates a security key based on a root key $K_{ASME}$ of the EUTRAN network, a specific value and/or other parameters and transmits a handover request message carrying the security key to a target evolved Node B, i.e. eNB; a UE generates the security key which used by the target eNB based on the root key $K_{ASME}$ of the EUTRAN network, the specific value and/or other parameters. The application of the present invention adopts a specific value, $K_{ASME}$ and/or other parameters to output a security key, which can solve the problem existed in the related technology, the problem is that the middle security key used by access layer while handover between different access system can not be generated, and then it can not realize the security protection of the access layer. So the application of the present invention makes the signaling and/or data of the access layer be efficiently protected, thereby improving the security of the access layer.

10 Claims, 5 Drawing Sheets

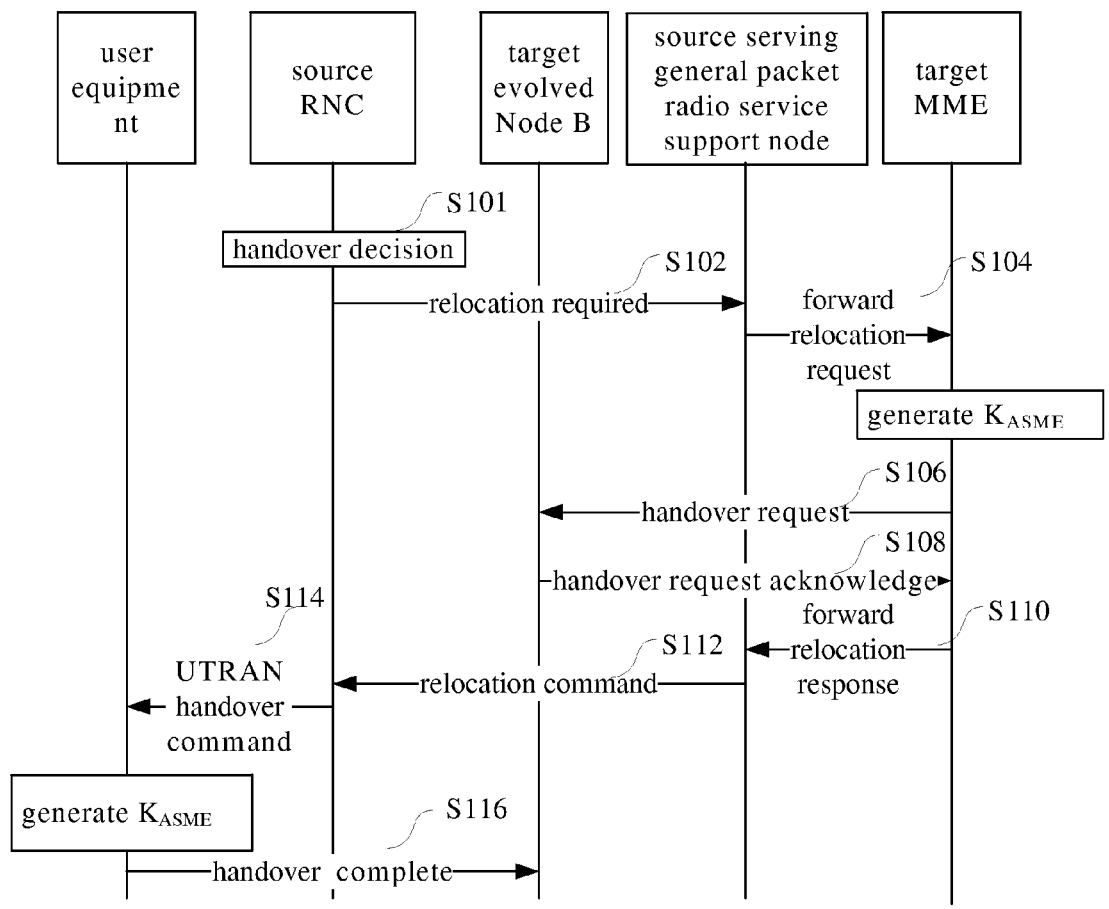
Fig._1

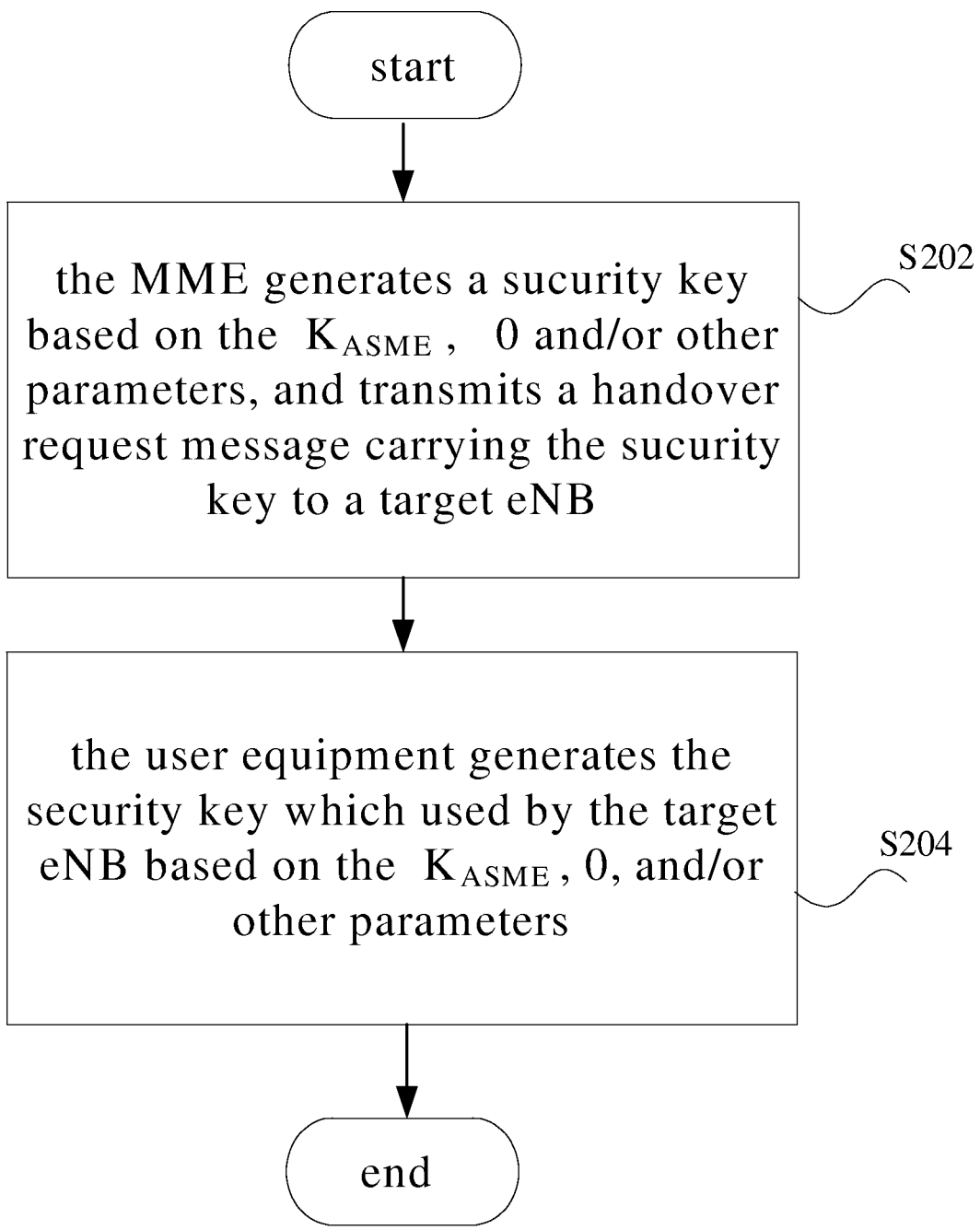
Fig._2

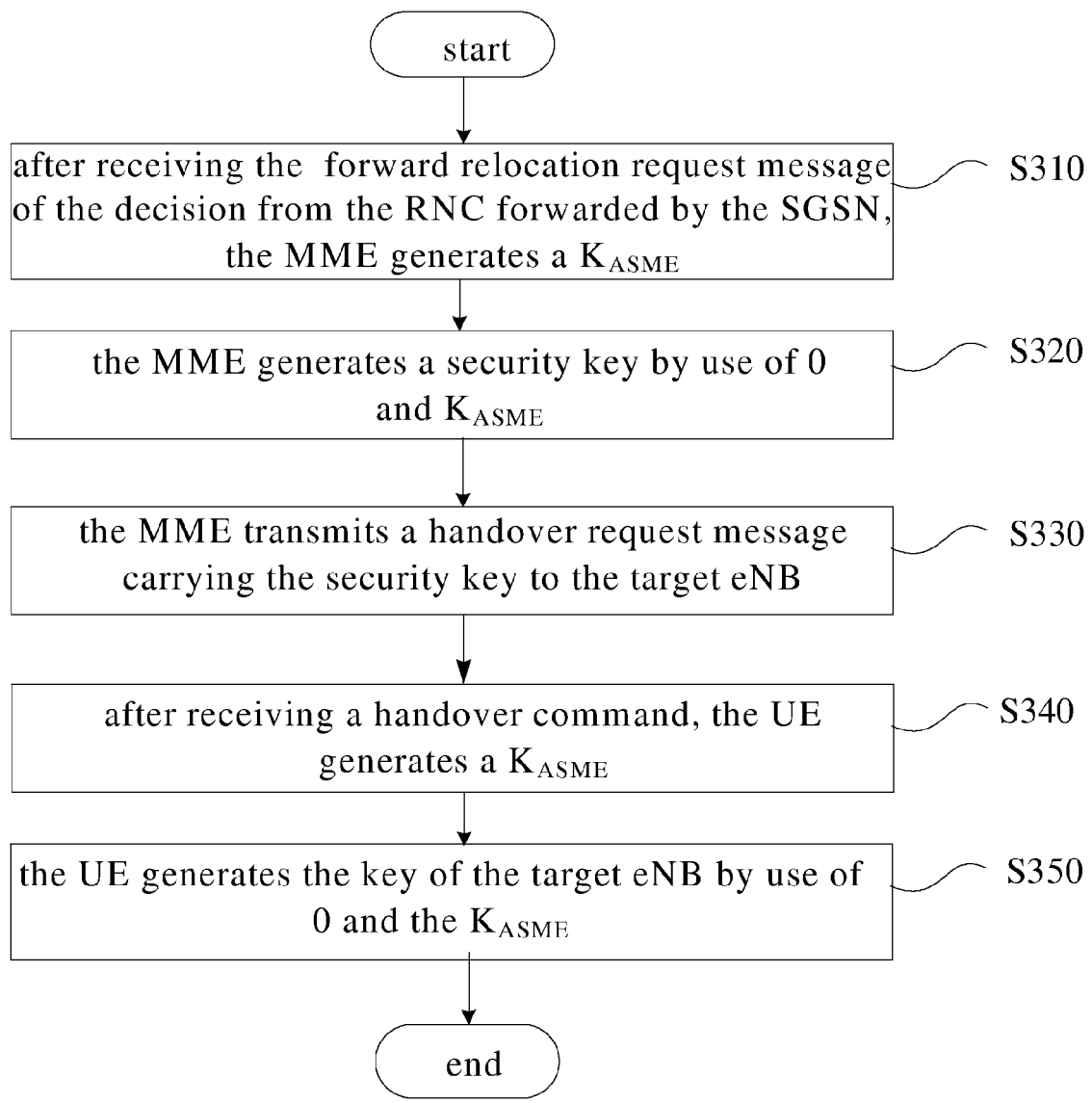
Fig._3

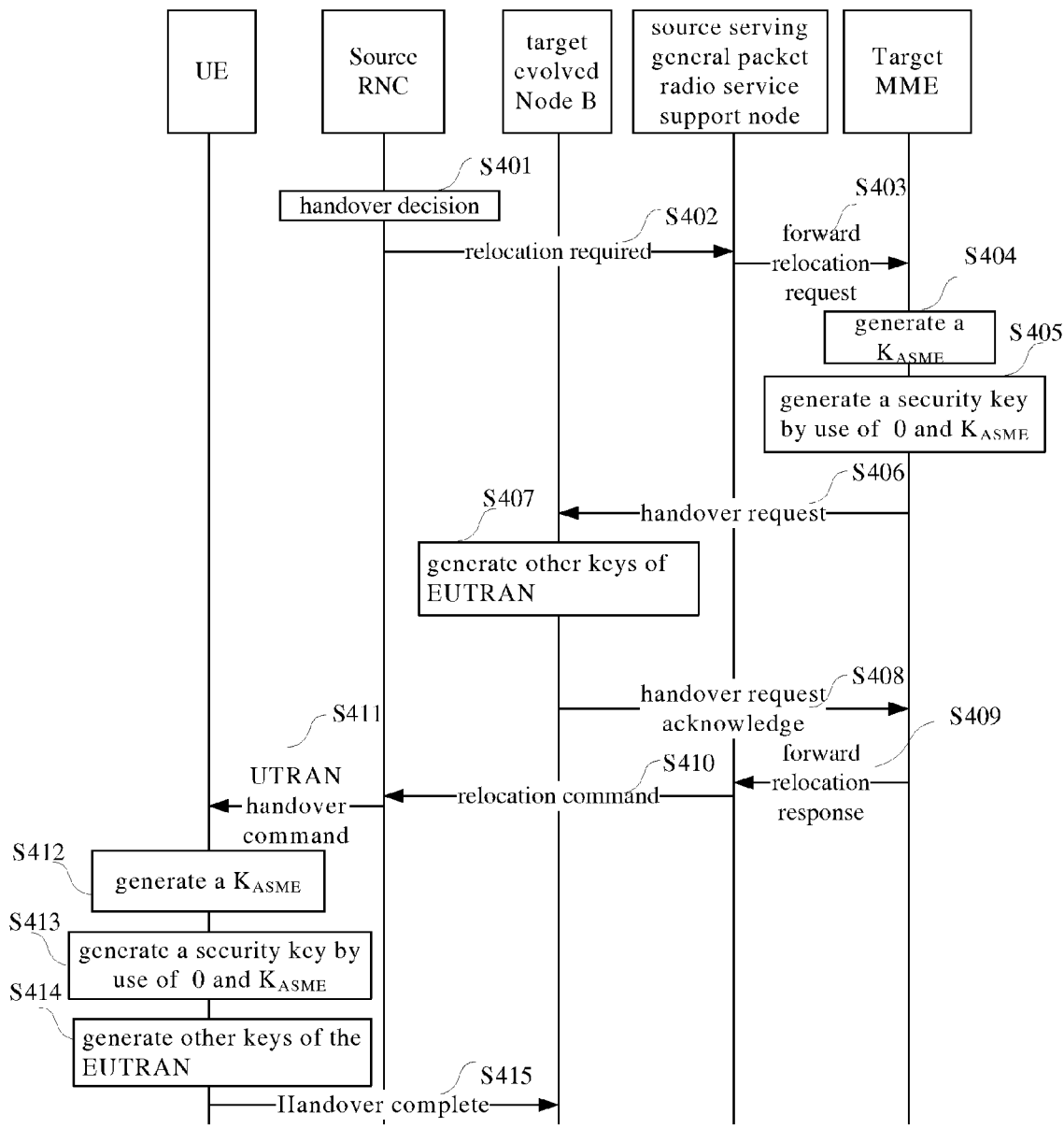
Fig._4

Fig._5
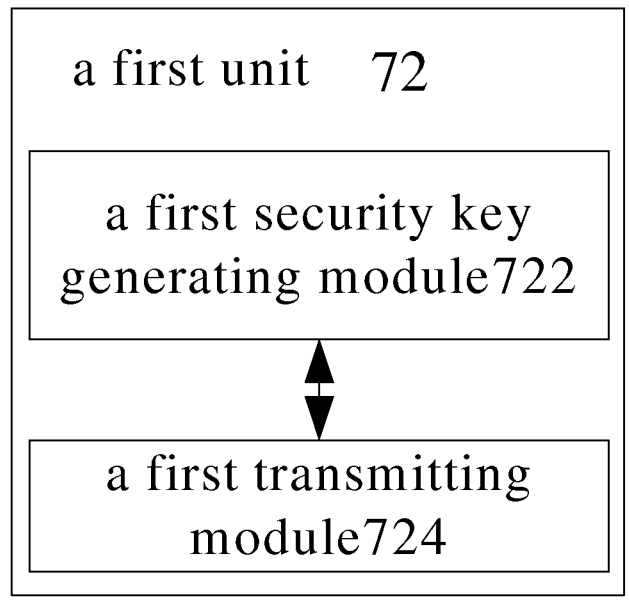
Fig._6
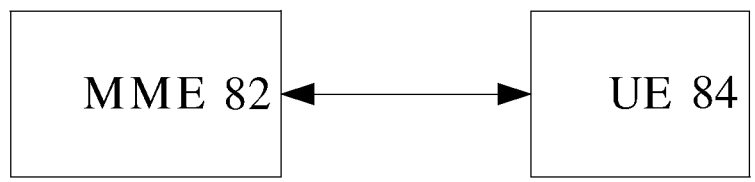
Fig._7

US 8,452,007 B2

SECURITY KEY GENERATING METHOD, DEVICE AND SYSTEM

CROSS-REFERENCE TO RELATED APPLICATIONS

This application is a U.S. national phase application under the provisions of 35 U.S.C. §371 of International Patent Application No. PCT/CN08/73868 filed Dec. 30, 2008, which in turn claims priority of Chinese Patent Application No. 200810066591.7 filed Apr. 16, 2008. The disclosures of such international patent application and Chinese priority patent application are hereby incorporated herein by reference in their respective entireties, for all purposes.

FIELD OF THE INVENTION

The present invention relates to security key generating technologies of communication fields, and more particularly to a security key generating method, device and system in the course of handover between different systems.

BACKGROUND OF THE INVENTION

The 3rd Generation Partnership Project (referred to as 3GPP) Evolved Packet System (referred to as EPS) is composed of the Evolved UMTS Terrestrial Radio Access Network (referred to as EUTRAN) and the EPS Evolved Packet Core (referred to as EPC). Wherein, the EPC can support the user access the Global System for Mobile Communication Enhanced Data Rate for GSM Evolution radio access network (referred to as GERAN) and the Universal Terrestrial Radio Access Network (referred to as UTRAN).

The EPC packet core network includes a Mobility Management Entity (referred to as MME), the MME is responsible for the related work of control plane including the management of mobility, the processing of non-access layer signaling, and the management of user safety mode. The MME saves the root key of EUTRAN—Key Access Safety Management Entity (referred to as $K_{ASME}$). In the EUTRAN, the Node-B equipment is an evolved Node-B (referred to as eNB), which is mainly responsible for the wireless communication, the management of wireless communication, and the management of mobility context. The root key of access layer used by the eNB is a Key eNB (referred to as $K_{eNB}$).

The equipment of the 3GPP Universal Mobile Telecommunication System (referred to as UMTS) system responsible for the management of mobility context, and/or the management of user safety mode is a Serving General Packet Radio Service Support Node (referred to as SGSN). In addition, the SGSN is further responsible for authenticating User Equipment (referred to as UE).

In the 3GPP UMTS system, the equipment responsible for the management of wireless communication is a Radio Network Controller (referred to as RNC) of the UTRAN. FIG. 1 is a flowchart illustrating a security key generating method when a UE handovers from the UTRAN to the EUTRAN in the related art. As shown in FIG. 1, when the UE handovers from the UTRAN to the EUTRAN (i.e. perform the step S101), if the UE and the MME do not save the EPS safety-related parameter such as $K_{ASME}$, the RNC make the MME generate the security key $K_{ASME}$ of the EUTRAN by sending a forward relocation request (i.e. perform the steps S102-S104); after the eNB acknowledges a handover request, the MME forwards a redirection replay to the RNC (i.e. proceed to steps S106-S112); the RNC performs a UTRAN handover command (i.e. perform the step S114); the UE side generates the security key $K_{ASME}$ of the EUTRAN and handover to the EUTRAN (i.e. perform the step S116).

At present, in the related technology, in the course of handover between different access systems, for example, handover to the EUTRAN from other network, though it is possible to generate the root key $K_{ASME}$ of the EUTRAN, it is impossible to generate the security key used by the access layer, for example the root key $K_{eNB}$ of access layer used by the eNB; therefore, the signaling and/or data of access layer can not be protected effectively, and the potential safety hazard exists.

SUMMARY OF THE INVENTION

Taking into account the problem existed in the related technology, the problem is that the middle security key used by access layer while handover between different access systems can not be generated, and then it can not realize the safety protection of the access layer, the main objective of the present invention is to provide an improved security key generating scheme, so as to solve at least one of the above problems in the related technology.

To achieve the above objectives, according to one aspect of the present invention, a security key generating method is provided.

A security key generating method according to the present invention is used for generating a security key in the process of the user equipment handover to a EUTRAN network from the other network, including: an MME generates a security key based on a root key $K_{ASME}$ of the EUTRAN network and a specific value and/or other parameters and transmits a handover request message carrying the security key to a target evolved Node B, i.e. eNB; a user equipment generates the security key used by the target eNB based on the root key $K_{ASME}$ of the EUTRAN network, and the specific value and/or other parameters.

Preferably, the above specific value is possessed by both the mobility management entity and the user equipment, and it is needless for forwarding the specific value to the mobility management entity, thereby avoiding extra signaling burden.

Preferably, the specific value is 0 possessed by both the mobility management entity and the user equipment.

Preferably, the operation of generating a security key based on a root key $K_{ASME}$ of the EUTRAN network, a specific value and/or other parameters includes: the specific value and/or other parameters and the root key $K_{ASME}$ are putted into a preset one-way key derivation function; the output of the one-way key derivation function is taken as a security key.

Preferably, the MME can generate a root key $K_{ASME}$ of the EUTRAN network based on the received forward relocation request message.

Preferably, after the target eNB receives the security key, the method further includes: the MME receives a handover request acknowledge message corresponding to the handover request message, and transmits a forward relocation response message corresponding to the forward relocation request message; the SGSN of the current network receiving the forward relocation response message, and transmits a relocation command message; the RNC of the current network transmits a handover command message to the user equipment; the user equipment generates a root key $K_{ASME}$ of the EUTRAN network based on the received handover command message.

To achieve the above objectives, according to another aspect of the present invention, a security key generating device is provided.

The security key generating device according to an embodiment of the present invention includes: a first unit, adapted to generate a security key based on the root key $K_{ASME}$ of the EUTRAN network and a specific value 0 and/or other parameters.

Preferably, the first unit can set on the MME; the first unit includes: a first security key generating module, adapted to generate a root key $K_{ASME}$ based on the received forward relocation request message, and generate a security key based on the root key $K_{ASME}$ and the specific value 0 and/or other parameters; a first transmitting module, adapted to transmit a handover request message carrying the security key to the target eNB.

Preferably, the first unit may also be set on the user equipment.

To achieve the above objectives, according to another aspect of the present invention, a security key generating system is provided.

The security key generating system according to an embodiment of the present invention includes: a mobility management entity, adapted to generate a security key based on a root key $K_{ASME}$ of the EUTRAN network and a specific value 0 and/or other parameters, and transmits a handover request message carrying the security key; a user equipment, adapted to receive a handover command message, and generate a security key based on the root key $K_{ASME}$ of the EUTRAN network and the specific value 0 and/or other parameters.

The application of the above technical scheme adopts a specific value and $K_{ASME}$ and/or other parameters to generate a middle security key used by the access layer and to output the security key, which can solve the problem existed in the related technology, the problem is that the middle security key used by access layer while handover between different access system can not be generated, and then it can not realize the safety protection of the access layer. So the application of the above technical scheme makes the signaling and/or data of the access layer be efficiently protected, thereby improving the safety of the access layer.

Furthermore, since the security key generating method, device and system of various embodiments of the present invention generates a security key by use of a specific value 0, it is needless for forwarding the specific value to the mobility management entity, thereby avoiding extra signaling burden.

Other features and advantages of the present invention will be set forth in part in the description which follows and, in part, will be obvious from the description, or may be understood by practice of the invention. The objectives and other advantages of the present invention may be implemented and achieved by the structures indicated particularly in the written description, claims and accompanying drawings.

BRIEF DESCRIPTION OF THE DRAWINGS

The accompanying drawings are used for further illustrating the present invention and constitute a part of the application; the illustrative embodiments of the present invention and the description of the embodiment are used for further explaining the present invention and are not for use in limiting the protection scope thereof. The description of the accompanying drawings is as follows:

FIG. 1 is a flowchart of a security key generating method when a UE handovers from the UTRAN to the EUTRAN according to the related art;

FIG. 2 is a flowchart of a security key generating method according to a method embodiment of the present invention;

FIG. 3 is a flowchart of a specific embodiment of a security key generating method according to the method embodiment 1 of the present invention;

FIG. 4 is a signaling flowchart of a security key generating method according to the method embodiment 2 of the present invention;

FIG. 5 is a schematic diagram of a security key generating device according to a device embodiment of the present invention;

FIG. 6 is a detailed structure schematic diagram of a security key generating device according to a device embodiment of the present invention;

FIG. 7 is a schematic diagram of a security key generating system according to a system embodiment of the present invention.

DETAILED DESCRIPTION OF THE INVENTION

Function Summary

Taking into account the problem existed in the related technology, the problem is that the middle security key used by access layer while handover between different access systems can not be generated, and then it can not realize the safety protection of the access layer, embodiments of the present invention provide an improved security key generating scheme; the application of an embodiment of the present invention adopts a specific value, $K_{ASME}$ and/or other parameters to generate the middle security key used by the access layer, and output the security key. So the application of the present invention makes the signaling and/or data of the access layer be efficiently protected, thereby improving the security of the access layer.

A detailed description of the present invention is provided hereinafter with reference to attached drawings and specific embodiments. It should be understood that, the embodiments offered herein are used for explaining the present invention only and shall not be used for limiting the protection scope of the present invention. If there is no conflict, embodiments of the present invention and the features of embodiments may be combined with each other.

Method Embodiments

A security key generating method is provided based on an embodiment of the present invention.

FIG. 2 is a flowchart of a security key generating method according to an embodiment of the present invention. It should be noted that, steps as shown in the flowchart may be performed in a computer system such as a group of computer executable instructions; besides, though a logic order is shown in the flowchart, in some cases, the shown or described steps may be performed based on a order different from that of the present invention.

As shown in FIG. 2, the security key generating method according to an embodiment of the present invention includes the following processes (steps S202-204):

Preferably, before performing the step S202, the MME generates a root key $K_{ASME}$ of the EUTRAN network based on the received forward relocation request message;

Step S202, the MME generates a security key based on a root key $K_{ASME}$ of the EUTRAN network, a certain value 0 and/or other parameters and transmits a handover request message carrying the security key to a target eNB; the specific value is a specific value possessed by both the MME and the user equipment, for example, the MME and the user equipment regard the specific value as 0 in default;

Specifically, the operation for generating a security key includes: a specific value and/or other parameters and the root key $K_{ASME}$ are putted into a preset one-way security key generating function; taking the output of the one-way security key derivation function as the security key;

Preferably, after the target eNB receives the security key, the MME receives a handover request acknowledge message corresponding to the handover request message, and transmits a forward relocation response message corresponding to the forward relocation request message; the SGSN of the current network receives the forward relocation response message, and transmits a relocation command message; the RNC of the current network transmits a handover command message to the user equipment; the user equipment generates a root key $K_{ASME}$ of the EUTRAN network based on the received handover command message;

Step S204, the user equipment generates the security key used by the target eNB based on the root key $K_{ASME}$ of the EUTRAN network and the specific value 0 and/or other parameters.

The security key generating method based on an embodiment of the present invention may generate a security key used by the EUTRAN network access layer. So the application of the present invention makes the signaling and/or data of the access layer be efficiently protected, thereby improving the security of the access layer. In addition, since this embodiment generates a security key by use of a specific value 0 of the EUTRAN network, it is needless for forwarding the specific value to the mobility management entity, thereby avoiding extra signaling burden.

Embodiment 1

FIG. 3 is a flowchart of a specific embodiment of a security key generating method according to the embodiment 1 of the present invention. As shown in FIG. 3, this embodiment shows a flowchart of a security key generating method in the course of the UE handover from the UTRAN to the EUTRAN; the perform process includes the following steps (steps S310-S350):

Step S310, after receiving the forward relocation request message from the RNC forwarded by the SGSN, the MME generates a $K_{ASME}$ based on the forward relocation request message; preferably, the MME can generate the $K_{ASME}$ by use of parameters of forward relocation request message including Integrity Key (referred to as IK) and Ciphering Key (referred to as CK). In addition, the $K_{ASME}$ can further be generated by use of the Public Land Mobile Network Identity (referred to as PLMN-ID) of the forward relocation request message;

Step S320, the MME generates a security key by use of a specific value 0 and $K_{ASME}$;

Step S330, after generating the security key, the MME transmits a handover request message carrying the security key to the target eNB;

Step S340, after receiving a handover command, the UE generates a $K_{ASME}$;

Step S350, the UE generates the security key used by the target eNB by use of a specific value 0 and the $K_{ASME}$.

Preferably, after generating the access layer security key used by the eNB, the method may further include the following steps: the eNB and the UE further generates the Encryption key, Integrity Key and/or user plane Encryption key of the EUTRAN network to start the corresponding security protection.

The security key generating method of this embodiment adopts the specific value 0 and $K_{ASME}$ to output a security key, which can solve the problem existed in the related technology, the problem is that the $K_{eNB}$ while the UE handover from the UTRAN to the EUTRAN can not be generated, thereby improving the security protection.

Embodiment 2

FIG. 4 is a signaling flowchart of a security key generating method according to the embodiment 2 of the present invention. In FIG. 4, the source RNC and the source SGSN represent the equipments of UMTS connected to the UE currently; the target eNB and the target MME represent the equipments of EPS handover. As shown in FIG. 4, the signaling flowchart of a security key generating method according to embodiment 2 of the present invention includes the following steps (steps S401-S415):

Step S401, the source RNC of UTRAN determines to start the handover, which may be triggered based on a measuring report sent to the RNC by the UE, or based on the other reason;

Step S402, the source RNC transmits a relocation required message to the source SGSN;

Step S403, the source SGSN transmits the forward relocation request message to the target MME, and transmitting an IK and a CK to the target MME;

Step S404, after receiving the forward relocation request message, the target MME generates a $K_{ASME}$ by use of Integrity Key (IK), Ciphering Key (CK) and other parameters such as PLMN-ID;

Step S405, the target MME generates a security key $K_{eNB}$ by use of a specific value 0 and $K_{ASME}$;

Step S406, the target MME transmits a handover request message carrying the security key $K_{eNB}$ to the target eNB;

Step S407, the target eNB can further generate the other security keys of the EUTRAN network such as radio resource control encryption key, integrity key and user plane encryption key; the target eNB starts the security protection successfully;

Step S408, the target eNB replies a handover request acknowledge message to the target MME representing accepting the handover request;

Step S409, after receiving the handover request acknowledge message from the target eNB, the target MME transmits the forward relocation response message to the source SGSN;

Step S410, the source SGSN transmits a relocation command to the source RNC;

Step S411, the source RNC transmits a UTRAN handover command to the UE;

Step S412, the UE generates a $K_{ASME}$ based on the current UTRAN handover command;

Step S413, the UE generates a security key $K_{eNB}$ of UE side by use of the specific value 0 and $K_{ASME}$;

Step S414, the UE can further generate the other security keys of the EUTRAN network such as radio resource control encryption key, integrity key and user plane encryption key by use of the security key $K_{eNB}$; the UE starts the security protection successfully;

Step S415, the UE transmits a handover complete message to the target eNB; the handover complete message can be ciphered by use of the radio resource control encryption key and performed the integrity protection by use of integrity key; since the radio resource control encryption key and integrity key generated by the target eNB are identical with those of the UE side, the handover complete message transmitted by the user side UE can be deciphered successfully.

In the course of generating a security key of this embodiment, the security key can be generated by adopting a one-way security key derivation function and take 0 and $K_{ASME}$ and/or other parameters as input parameters; other parameters may be selected based on the actual situation; to simplify the description of this embodiment, there is no other parameters selected; it should be understood by those skilled in the art that, other parameters are not limited to null, which does note influence the essence of this embodiment of the present invention.

Device Embodiment

A security key generating device is further provided according to an embodiment of the present invention.

FIG. 5 is a schematic diagram of a security key generating device according to a device embodiment of the present invention. As shown in FIG. 5, the security key generating device according to a device embodiment of the present invention includes:

a first unit 62, adapted to generate a security key K based on the root key $K_{ASME}$, and a specific value 0 and/or other parameters of the EUTRAN network. Preferably, the first unit 62 is set on the MME or on the user equipment, so as to generate the access layer security key of the EUTRAN network by the user equipment side; in addition, the related function of the first unit 62 can refer to the related description of method embodiment, which is not described repeatedly again.

The security key generating process of the security key generating device of this embodiment is similar to that of method embodiment, and it is necessary for generating the access layer security key of the EUTRAN network based on the $K_{ASME}$ and the specific value 0.

Based on the above description, FIG. 6 further shows a detailed structure schematic diagram of a security key generating device according to an embodiment of the present invention. As shown in FIG. 6, the first unit 72 of this embodiment is set on the MME; the first unit 72 includes: a first security key generating module 722, adapted to generate a root key $K_{ASME}$ based on the received forward relocation request message, and generate a security key K based on the security key $K_{ASME}$ and a specific value 0; a first transmitting module 724, adapted to transmit a handover request message carrying the security key K to the target eNB.

This embodiment is a concretion of the embodiment as shown in FIG. 5; as described above, the first unit 72 can be set on the MME or on the user equipment, which is not described repeatedly again.

System Embodiment

A security key generating system is further provided according to an embodiment of the present invention.

FIG. 7 is a schematic diagram of a security key generating system according to a system embodiment of the present invention. As shown in FIG. 7, the security key generating system according to a system embodiment of the present invention includes: a mobility management entity 82 and a user equipment 84, which is hereinafter described.

The mobility management entity 82, adapted to generate a security key K based on a root key $K_{ASME}$, specific value information and/or other parameters, and transmit a handover request message carrying the security key K;

The user equipment 84, adapted to receive a handover command message, and generate a security key K based on the root key $K_{ASME}$, specific value information and/or other parameters of the EUTRAN network.

This embodiment may refer to the process of method embodiment as shown in FIG. 2-FIG. 4; FIG. 2-FIG. 4 can be understood as embodiments analysis schematic diagrams of the security key generating system according to an embodiment of the present invention, through which the target eNB and the user equipment generate the security key used by the EUTRAN network access layer.

It should be noted that, in the above multiple embodiments the specific value is 0, which may also be set as the other value.

In view of the above, the application of the security key generating method, device and system provided by embodiments of the present invention adopts a specific value and $K_{ASME}$ to generate a security key used by the access layer, and to output the security key. So the application of the present invention makes the signaling and/or data of the access layer be efficiently protected, thereby improving the security of the access layer. At the same time, it is needless for forwarding the used parameters such as a specific value to the mobility management entity, thereby avoiding extra signaling burden.

Obviously, it should be understood by those skilled in the art that, the above various modules or steps of the present invention may be implemented by use of a universal computing device; they may be centralized at a single computing device or distributed at the network composed of multiple computing devices; alternatively, they may be implemented by an executable program code of computing device, therefore which may be stored in a storage device and executed by a computing device, or which may be respectively formed as various integrated circuit modules, or multiple modules or steps of which may be formed as single integrated circuit module. Therefore, the present invention is not limited to any specific combination of hardware and software.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

The invention claimed is:

1. A security key generating method, for generating a security key in the course of the user equipment handover from other network to the Evolved UMTS Terrestrial Radio Access Network (EUTRAN), comprising:
generating, by a mobility management entity, a security key based on a root key $K_{ASME}$ of the EUTRAN network, and a specific value and/or other parameters, wherein the mobility management entity generates the root security $K_{ASME}$ of the EUTRAN network based on a received forward relocation request message;
transmitting to a target evolved Node-B (eNB) a handover request message carrying the security key;
generating, by the user equipment, the security key used by the target eNB based on the root key $K_{ASME}$ of the EUTRAN network, and a specific value and/or other parameters;
after the target eNB receives the security key,
receiving, by the mobility management entity, a handover request acknowledge message corresponding to the handover request message, and sending a forward relocation response message corresponding to the forward relocation request message to a Serving General Packet Radio Service Support Node (SGSN) of the current network;
receiving, by the SGSN of the current network, the forward relocation response message, and transmitting a relocation command message;

transmitting, by a Radio Network Controller (RNC) of the current network, a handover command message to the user equipment; and generating, by the user equipment, a root key $K_{ASME}$ of the EUTRAN network based on the received handover command message.

2. The security key generating method of claim 1, wherein the specific value is possessed by both the mobility management entity and the user equipment.

3. The security key generating method of claim 1, wherein the specific value is 0.

4. The security key generating method of claim 1, wherein the step of generating a security key based on a root key $K_{ASME}$ of the EUTRAN network, and a specific value and/or other parameters comprises:

inputting the specific value and/or other parameters and the root key $K_{ASME}$ into a preset one-way key derivation function;

taking the output of the one-way key derivation function as the security key.

5. A security key generating device, for generating a security key in the course of the user equipment handover from other network to the Evolved UMTS Terrestrial Radio Access Network (EUTRAN) network, comprising:

a first unit, adapted to generate a security key K based on the root key $K_{ASME}$ of the EUTRAN network based on a received forward relocation request message and a specific value and/or other parameters for being carried in a handover request message transmitted to a target evolved Node-B (eNB), receive a handover request acknowledge message corresponding to the handover request message after the receipt of the security key by the eNB, and send a forward relocation response message corresponding to the forward relocation request message to a Serving General Packet Radio Service Support Node (SGSN) of a current network, thereby enabling the SGSN of the current network to transmit a relocation command message, and enabling the transmission of a handover command message to the user equipment by a Radio Network Controller (RNC) of the current network, so as to facilitate the generation of a root $K_{ASME}$ of the EUTRAN network based on the received handover command message by the user equipment.

6. The security key generating device of claim 5, wherein the first unit is set on the mobility management entity, the first unit comprise:

a first security key generating module, adapted to generate a root key $K_{ASME}$ based on the received forward relocation request message, and generate a security key based on the root key $K_{ASME}$ and a certain specific value and/or other parameters;

a first transmitting module, adapted to transmit a handover request message carrying the security key to the target eNB.

7. The security key generating device of claim 5, wherein the first unit is set on the user equipment.

8. The security key generating device of claim 5, wherein the specific value is 0.

9. A security key generating system, comprising:

a mobility management entity, adapted to generate a security key based on a root key $K_{ASME}$ of the Evolved UMTS Terrestrial Radio Access Network (EUTRAN) network based on a received forward relocation request message and a specific value and/or other parameters, and transmit a handover request message carrying the security key to a target evolved Note-B (eNB), receive a handover request acknowledge message corresponding to the handover request message after the receipt of the security key by the eNB, and send a forward relocation response message corresponding to the forward relocation request message to a Serving General Packet Radio Service Support Node (SGSN) of a current network; and a user equipment, adapted to receive a handover command message, and to generate a security key based on the root key $K_{ASME}$ of the EUTRAN network, and the specific value and/or other parameters.

10. The security key generating system of claim 9, wherein the specific value is 0.

* * * * *